United States Patent [19]

Kringe

[11] Patent Number: 4,700,754
[45] Date of Patent: Oct. 20, 1987

[54] ARRANGEMENT FOR CONTROLLING THE LEVEL OF AN INK CONTAINER

[75] Inventor: Horst Kringe, Netphen, Fed. Rep. of Germany

[73] Assignee: U.S. Philips Corporation, New York, N.Y.

[21] Appl. No.: 880,397

[22] Filed: Jun. 30, 1986

[30] Foreign Application Priority Data

Jul. 6, 1985 [DE] Fed. Rep. of Germany ....... 3524250

[51] Int. Cl.⁴ .............................................. B65B 3/04
[52] U.S. Cl. ...................................... 141/95; 141/198; 73/304 R; 340/620; 346/140 R; 400/470
[58] Field of Search ........................... 141/94, 95, 198; 340/620; 73/304 R; 222/64, 65, 66; 346/140 R; 101/364, 366; 400/470

[56] References Cited

U.S. PATENT DOCUMENTS

| 4,551,734 | 11/1985 | Causley et al. | ................. 73/304 R |
| 4,626,874 | 12/1986 | Murai et al. | ..................... 73/304 R |

*Primary Examiner*—Houston S. Bell, Jr.
*Attorney, Agent, or Firm*—Robert T. Mayer

[57] ABSTRACT

An arrangement for indicating the refilling level of a collapsible ink container (1,2) comprising a measuring circuit having an alternating voltage source (U~) to form an electric control signal which depends on the capacitance (8) between the liquid ink and an electrically conductive coating (5) which is insulated with respect to the ink by the wall of the ink container wherein the electrically conductive coating (5) is provided on the outside of the lower part (1) of the ink container.

4 Claims, 1 Drawing Figure

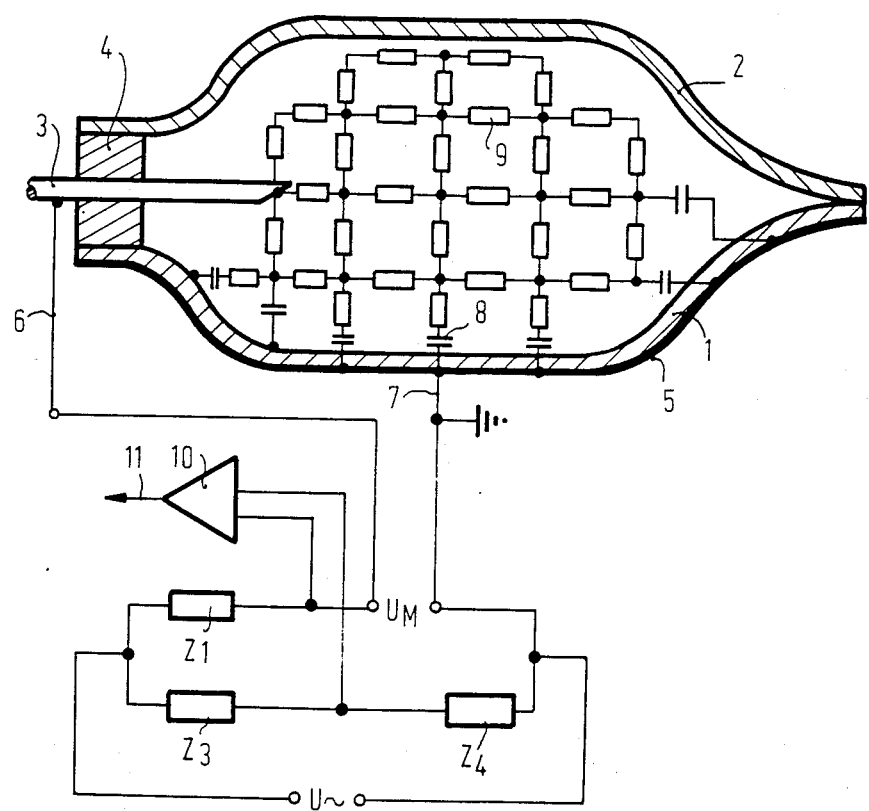

ARRANGEMENT FOR CONTROLLING THE LEVEL OF AN INK CONTAINER

The invention relates to an arrangement for controlling the level of a collapsible ink container comprising a measuring circuit having an alternating voltage source to form an electric control signal which depends on the capacity between the liquid ink and an electrically conductive coating which is insulated from the ink by the wall of the ink container.

In such an arrangement known from German Patent Publication No. 28 32 908 the collapsible ink container is accommodated in a rigid housing. The electrically conductive coating is provided on the inner wall of the rigid housing. The capacity measured between the liquid ink and the electrically conductive coating depends not only (as desired) on the quantity of the liquid ink but also on how the ink pouch engages the rigid housing. At low ink levels which are to be indicated by the control, edge areas of the ink container can lift from the bottom surface of the housing. As a result of this too low an ink level can be indicated and a premature replacement of the ink container can result. Furthermore, the curve representing capacitance as a function of ink level has a gradual slope. As a result it is difficult to obtain consistent indications of when a refilling is necessary. As a result of this the possibility exists that a signal for indicating the falling below a minimum refilling level is not given at the right time. The required sucking forces for the taking up of ink then increase considerably so that the possibility exists that air penetrates into the ink transporting paths. As a result of this the reliability, for example, of an ink jet printing head, can be adversely influenced.

It is an object of the invention to improve the reliability of an arrangement of the type mentioned in the opening paragraph by simple means.

This object is achieved in that the ink container consists of a lower part and a flexible collapsible upper part and the electrically conductive coating is provided on the outside of the lower part.

The invention provides the advantage that the electrically conductive coating always has a defined distance to the surface of the liquid ink. An essential instability factor which may lead to adulteration of the measured results is thus precluded.

The wetting surface of the ink at the tub-shaped lower part and hence the measured capacity decrease very rapidly below a certain level so that a clear warning signal can be derived at predetermined low levels within a range.

Furthermore, in order to increase the selectivity it is particularly advantageous not only to consider the capacity as a decisive criterion for the refilling level, but also to measure the voltage drop at the series arrangement of the capacitive reactance and the ohmic resistance formed by the liquid ink.

The frequency of the alternating voltage used for the measurement can advantageously be chosen to be such that the ohmic resistance of the liquid ink from the current supply to the inner wall of the ink container and the capacitive reactance have approximately the same order of magnitude.

An embodiment of the invention is shown diagrammatically in the drawing, the sole FIGURE of which is a cross-sectional view through an ink container having a metalization provided on the lower part and a connected measuring circuit.

The ink container comprises a tub-shaped lower part 1 of an insulating material and a flexible upper part 2. The collapsible inner space formed by said parts is filled with air-free liquid ink. The ink is supplied through a metallic tubular needle 3 which is inserted into the inner space through a sealing connection member 4. The lower part 1 may be rigid. However, preferably it is also flexible. The invention can be used particularly advantageously with a container which is totally flexible. As those skilled in the art will understand conventional teaching is to provide electrodes inside the container and with totally flexible containers this is very difficult.

An electrically conductive layer 5 is vapour deposited on the outside of the lower part 1.

The liquid ink and the layer 5 form mutually insulated surface electrodes of a capacitor having in-between the insulating wall of the lower part 1 as a dielectric. The liquid ink can be reached galvanically by the line 6 and the hollow needle; the conductive layer 5 is by way of the connection line 7 connected to earth potential.

A current is conducted from the voltage source $U\sim$ by way of the bridge resistor $Z_1$ through the liquid ink and the capacitor formed by the electrically conductive layer 5 and substantially the oppositely located surface of the liquid ink. The capacitor is shown symbolically in the form of individual capacitor elements 8. On its way from the needle 3 to the capacitor elements 8 the current has to overcome the ohmic resistance of the liquid ink which is denoted symbolically as a plurality of individual resistance elements 9.

The ohmic resistance becomes larger as the level of the ink gets lower. The capacity between the liquid ink and the electrically conductive surface 5 decreases very rapidly when the quantity of the liquid ink has decreased to such an extent that only parts of the inner surface of the ink container are wetted. As is obvious, as this occurs, the part of the surface of the electrically conductive layer 5 which is situated oppositely to the liquid ink becomes smaller.

The voltage drop $U_M$ at the apparent reactance formed by the series arrangement of the resistance of the ink and the capacitor is compared with the voltage drop at the bridge resistor $Z_4$. The differential voltage applied to the amplifier 10 serves as a measure of the container level of the ink container. An output signal 11 of the amplifier 10 can be used arbitrarily for indication and control. It will be obvious to those skilled in the art that the bridge resistors $Z_1$, $Z_2$ and $Z_4$ consist at least partly of series arrangements of ohmic resistors and capacitors and, for example, may be proportioned so that in the case the critical minimum refilling level is reached the differential voltage applied to the amplifier 10 substantially disappears.

What is claimed is:

1. An arrangement for indicating the refilling level of a collapsible ink container comprising a measuring circuit having an alternating voltage source said circuit producing an electric control signal which depends on the capacitance between the liquid ink and an electrically conductive coating which is insulated with respect to the ink by the wall of the ink container, wherein the ink container comprises a lower part (1) and a flexible collapsible upper part (2) and that the electrically conductive coating (5) is provided on the outside of the lower part (1).

2. An arrangement as claimed in claim 1, wherein the control signal (11) is formed by the voltage drop at the series arrangement of the capacitance and the ohmic resistance of the liquid ink.

3. An arrangement as claimed in claim 2, wherein the series arrangement of the capacitance and the ohmic resistance of the liquid ink forms a branch of a bridge circuit.

4. An arrangement as claimed in any one of claims 1 to 3, wherein the electrically conductive coating (5) is connected to earth potential and a metallic electrode applies an alternating voltage to the liquid ink.

* * * * *